United States Patent [19]
Burbeck

[11] Patent Number: 5,884,081
[45] Date of Patent: Mar. 16, 1999

[54] METHOD AND SYSTEM FOR SYNCHRONIZING CODE WITH DESIGN

[75] Inventor: Stephen Lee Burbeck, Cary, N.C.

[73] Assignee: International Business Machines Corp., Armonk, N.Y.

[21] Appl. No.: 769,910

[22] Filed: Dec. 19, 1996

[51] Int. Cl.$^6$ .................................................... G06F 9/00
[52] U.S. Cl. ........................ 395/704; 395/702; 707/102
[58] Field of Search ................................. 395/702, 703, 395/704, 705, 707, 708; 707/102, 103

[56] References Cited

U.S. PATENT DOCUMENTS

| | | | |
|---|---|---|---|
| 4,864,569 | 9/1989 | DeLucia et al. | 395/184.13 |
| 5,408,667 | 4/1995 | Brodie et al. | 395/702 |
| 5,450,586 | 9/1995 | Kuzara et al. | 395/704 |

*Primary Examiner*—Thomas Peeso
*Attorney, Agent, or Firm*—A. Bruce Clay

[57] ABSTRACT

Code is synchronized with design in an object oriented computer programming environment. Execution steps are created for a selected method. Then, as directed by the execution steps, the design is traced through one step at a time. Tracing includes fetching appropriate design information and checking for design violations.

27 Claims, 17 Drawing Sheets

METHOD AND SYSTEM FOR SYNCHRONIZING CODE WITH DESIGN

FIELD OF THE INVENTION

The present invention relates in general to computer software and in particular to a method and system for synchronizing actual code with design.

BACKGROUND OF THE INVENTION

Software designs, much like abstract analogs (such as maps and blueprints), are built because they are useful for explaining, navigating, and understanding the richer underlying realities. With software, however, it is rare for even the most general design of an implemented system to be either complete or accurate. In many projects, senior programmers brainstorm on a white board, produce the program and produce just enough of a retrospective design to satisfy management. In projects with formal analysis and design stages, the design may be accurate when it is first made, but it seldom matches the final implementation. As code is developed it diverges from the design. These changes are rarely transferred back to the design documents because programmers seldom take the trouble to find and edit the design documents.

The lack of accurate design adds dramatically to the life cycle cost of software systems. Mismatches between design and code slow initial development of large systems because teams working on one portion of the system rely in part upon the design descriptions of other portions of a system. Inaccurate design has an even more dramatic effect on maintenance because maintenance done without understanding the underlying design is time consuming and prone to error.

Design and code can neither be completely separated from each other nor completely joined with one another. They overlap in that both describe the same system but are different because the intended audience of those descriptions are quite different. Design communicates the intent of the designers to other humans, while code communicates design intent to the machine. Humans share a vast common knowledge and can deal with abstractions but are weak at handling masses of detail. The machine is not hampered by details but is oblivious to abstraction and generality.

One prior art approach to synchronizing code and design supposes that if programmers are unable or unwilling to keep the code synchronized with design, perhaps programmers can be dispensed with and simply generate the code from the design. In some cases, such as when an application merely maintains a database, this approach works. However, for general programming this approach fails for several reasons. One of these reasons is that analysts and designers seldom, if ever anticipate all the details encountered in the actual coding. Programmers need to make changes that extend or "violate" the design because they discover relationships or cases not foreseen by the designers. Removing the programmers from the process does not impart previously unavailable omniscience to the designers. Additionally, most real world applications contain behavior that is best described with algorithmic expressions. Programming code constructs have evolved to effectively and efficiently express such algorithms. Calling a detailed description of algorithmic behavior "design" simply because it is expressed in a formalism that isn't recognizable as "code" does not eliminate the complexity of the algorithmic behavior.

Another previously known method is the automated extraction of object structure from code. Some tools are available that can create more or less detailed object structure diagrams directly from C++ class definitions that contain inheritance and attribute type information. Some Smalltalk systems also provide attribute "type" information that allows these tools to be similarly effective. Without the attribute information, tools can only extract the inheritance structure. This method does not actually parse and model code other than C++ header files or Smalltalk class definitions. Therefore, this approach can at best identify "has-a" and "is-a" relationships. These relationships may imply collaboration but this approach does not specifically identify any of the transient collaborations that are important for understanding design. In addition, it does not provide any information about algorithms.

Another method is the automated deduction of design by analyzing code execution. Collaborations implicit in Smalltalk code are difficult to deduce statically from the code and may not be fully determined until run time. However, Smalltalk is strongly typed at runtime so it may be determined exactly what kind of objects are participating in all collaborations by examining the receiver and the arguments involved in all message sends. The resulting information can be used to specify the collaborations observed during the execution. This method suffers from the following problems: (1) it requires test cases to exercise the code; each of these test cases must construct an initial state which is sometimes elaborate; (2) the test cases themselves require careful construction and may become obsolete as the system changes; (3) the effort needed to construct and maintain these test cases can be a deterrent to routine use of this technique; and (4) full coverage by the test cases is difficult to obtain and the degree of coverage is difficult to assess. This undermines confidence in the resulting design. Without full coverage, the extracted collaboration design is likely to be incomplete in important ways. For instance, the way a system is designed to handle the exceptional cases can be more telling than the way it handles the common ones.

A further method previously known is a static analysis of the parse tree that represents the code. Nodes in the parse tree share the ability to answer their "value" in terms of the type of the object they would represent at runtime given the type of objects they depend upon. The parse tree is then traversed in a depth first order to obtain the value of all the nodes. In this process, message expressions validate that their arguments are appropriate, variables validate assignments, and finally the value of the whole method (which is its return value) is validated against the design statement of what the method should return. As is the case when reading code, literal blocks complicate matters.

Code with literal blocks pose problems for static analysis in that these blocks are not necessarily invoked where they appear in the parse tree. Also, a literal block may be invoked more than once. Static analysis must not analyze a block when it first appears, and it must pass through that block each time it is invoked. No one-pass traversal of the parse tree can analyze this code. The parse tree approach to static analysis can be elaborated to handle multiple invocations of the same literal block and perhaps even recursive invocations of literal blocks. But the farther the analysis departs from a simple traversal of a parse tree, the more complex the system becomes.

Another practical problem with basing static analysis on a parse tree is that the parse trees used by the Smalltalk system compilers are optimized for byte code generation. The parse tree inheritance hierarchy may prove to be awkward for hosting a static analysis system. Also, many Smalltalk systems hide the code for parsing and compiling although that is more of an inconvenience than a real barrier.

Lastly, future systems may support the intermixing of multiple languages, e.g., Smalltalk, Java and Visual Basic, using the same bytecode set. Static analysis based on parse trees would have to be done separately for each language and is, therefore, potentially too complex and too difficult for practical use.

Thus, there is a need for a method and system which allows for a simple and efficient synchronization of code with design.

SUMMARY OF THE INVENTION

The present invention disclosed herein comprises a method and system for synchronizing code with design which substantially reduces problems associated with such synchronization. The present invention allows a developer to ensure that code matches design without having to write complete applications to test the code.

In accordance with one aspect of the present invention, code is synchronized with design in an object oriented computer programming environment. Execution steps are created for a selected method. Then, as directed by the execution steps, the design is traced through one step at a time. Tracing requires that appropriate design information be fetched and that design violations are checked for.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
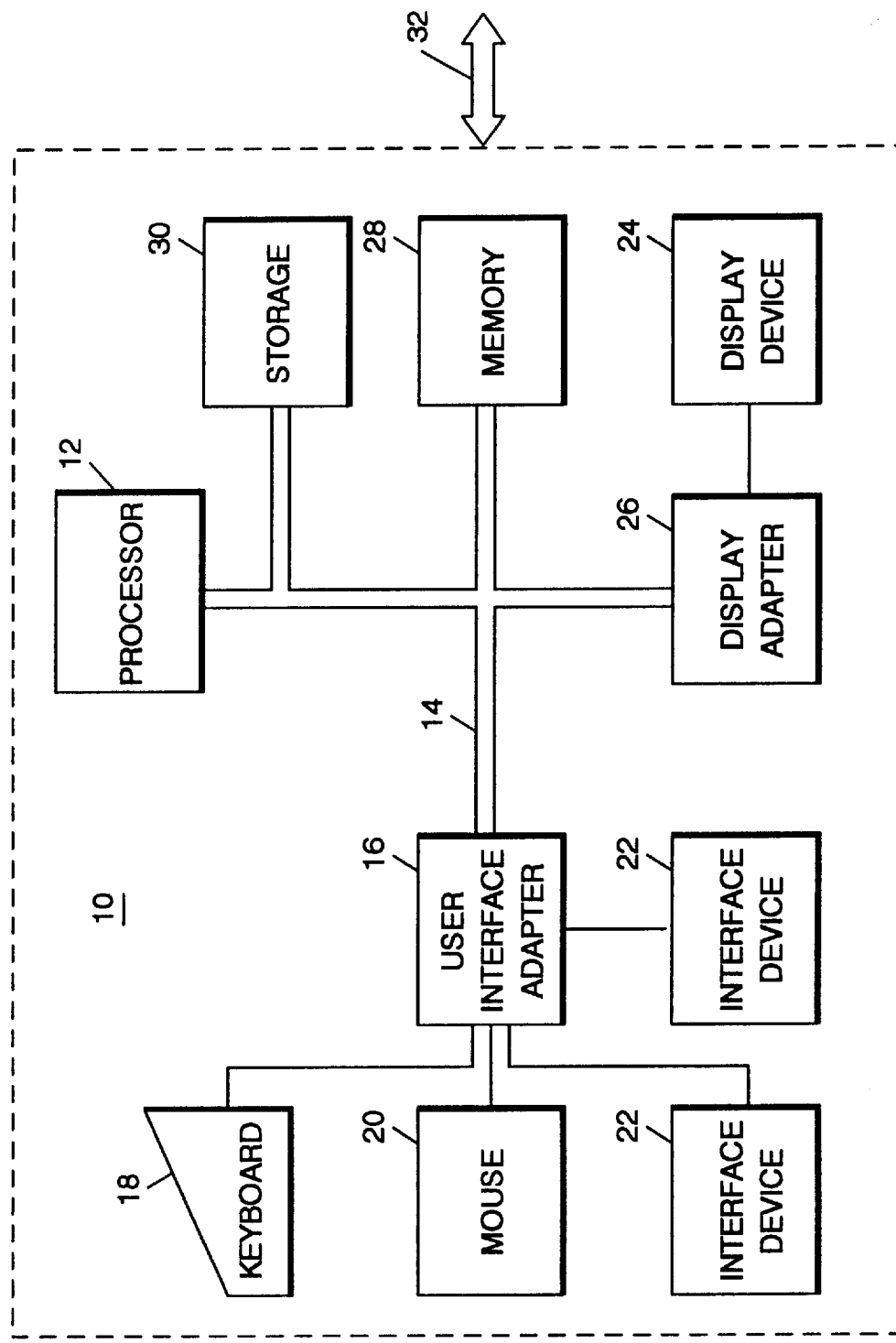
FIG. 1 illustrates a representative hardware environment in which the present invention may be practiced.

The present invention as described may be performed in an object oriented development language such as Smalltalk or Java. FIG. 1 illustrates a representative hardware environment 10 in which the present invention may be practiced. The environment of FIG. 1 is representative of a conventional single user of a computer workstation, such as a personal computer and related peripheral devices. The environment includes a microprocessor 12 and a bus 14 employed to connect and enable communication between the microprocessor 12 and the components of the workstation in accordance with known techniques. The workstation will typically include a user interface adapter 16, which connects the microprocessor 12 via the bus 14 to one or more interface devices, such as a keyboard 18 a mouse 20, and/or other interface devices 22, which can be any user interface device, such as a touch sensitive screen, digitized pen entry pad, etc. The bus 14 also connects a display device 24, such as an LCD screen or CRT, to the microprocessor 12 via a display adapter 26. The bus 14 also connects the microprocessor 12 to memory 28 and storage 30, which can include ROM, RAM, etc. The environment 10 may then be interconnected to a network such as LAN, WAN, Internet, etc., via connection 32.

Software program code which employs the present invention is typically stored in the memory 28 of the standalone workstation environment. In a client/server environment, the software program code may be stored with memory associated with the server. Software program code may be embodied on any of the variety of known media for use with the data processing system, such as a diskette or CD ROM. The software program code may be distributed on such media, or may be distributed to users from the memory of one computer system over a network of some type to other computer systems for use by users of such other systems. Such techniques and methods for embodying software code on physical media or distributing software code via networks are well-known and will not be discussed further herein.

The present invention is described below in its preferred embodiment, which is as part of a Smalltalk development environment. A Smalltalk development environment may operate on any of a variety of combinations of operating systems and hardware, and will be described independent of any specific operating system and hardware. Smalltalk is a dynamic object oriented language and is referred to as a pure object oriented language since it conforms to all the basic definitions of an object oriented language, such as inheritance, polymorphism, etc. These concepts will not be discussed unless particularly important to further the understanding of the present invention herein.

Figure 2:
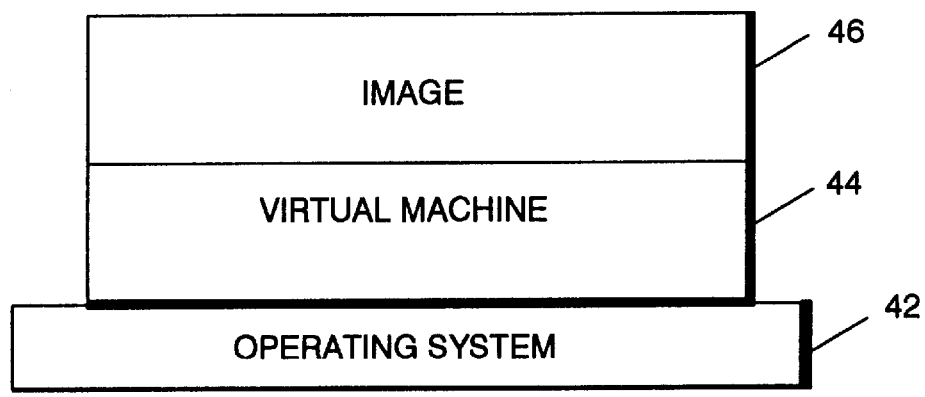
FIG. 2 illustrates the basic architecture of a Smalltalk oriented development environment.

FIG. 2 illustrates the basic architecture of a Smalltalk object oriented development environment, such as VisualAge for Smalltalk from IBM. The object oriented development environment is itself an application which runs on an underlying operating system 42. A portion of the development environment known as a virtual machine 44 interacts with the operating system 42. Smalltalk development environment is hierarchical, and an image portion 46 of the development environment continues hierarchies of classes tied into the virtual machine 44 and can be viewed as logically running on top of the virtual machine 44. The image 46 is the portion of the development environment with which a developer interacts to develop an object oriented application. The image portion 46 of the development environment includes a variety of classes provided in different hierarchies which provide functions at many different levels. At a high level, an entire set of classes may comprise a framework which provides substantially complete function desired by the developer, which a developer may pull into the application being developed. On the other hand, the function may not be provided in such a neat package as a framework by the development environment, thus requiring the developer to combine relatively low level classes or individual classes or to write new classes in order to create the desired function for the application being developed.

The image 46 also includes application development tools which differ in different environments. The tools may include a class browser for viewing classes and methods, version control systems for permitting incremental development and saving of applications under development, debuggers for debugging applications created using the development environment, etc. The development environment also includes a Smalltalk compiler which links and compiles portions of the application. Smalltalk being an interpreted language, portions of the application will remain in byte-code form, which are interpreted by the run-time engine (often referred to as the virtual machine) during execution.

Figure 3:
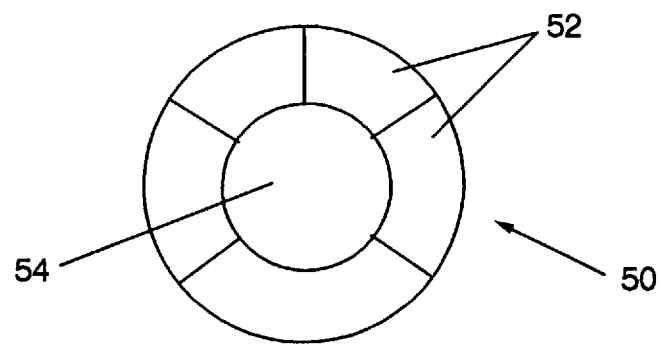
FIG. 3 illustrates an industry standard of an object.

FIG. 3 is an industry standard representation of an object 50. Methods 52 of the object 50 provide function, while a data portion 54 includes data associated with the object 50. An object is an instantiation of a class from the hierarchy of classes which a developer has designated for use in an application. The same class may be used many times in an application.

Figure 4:
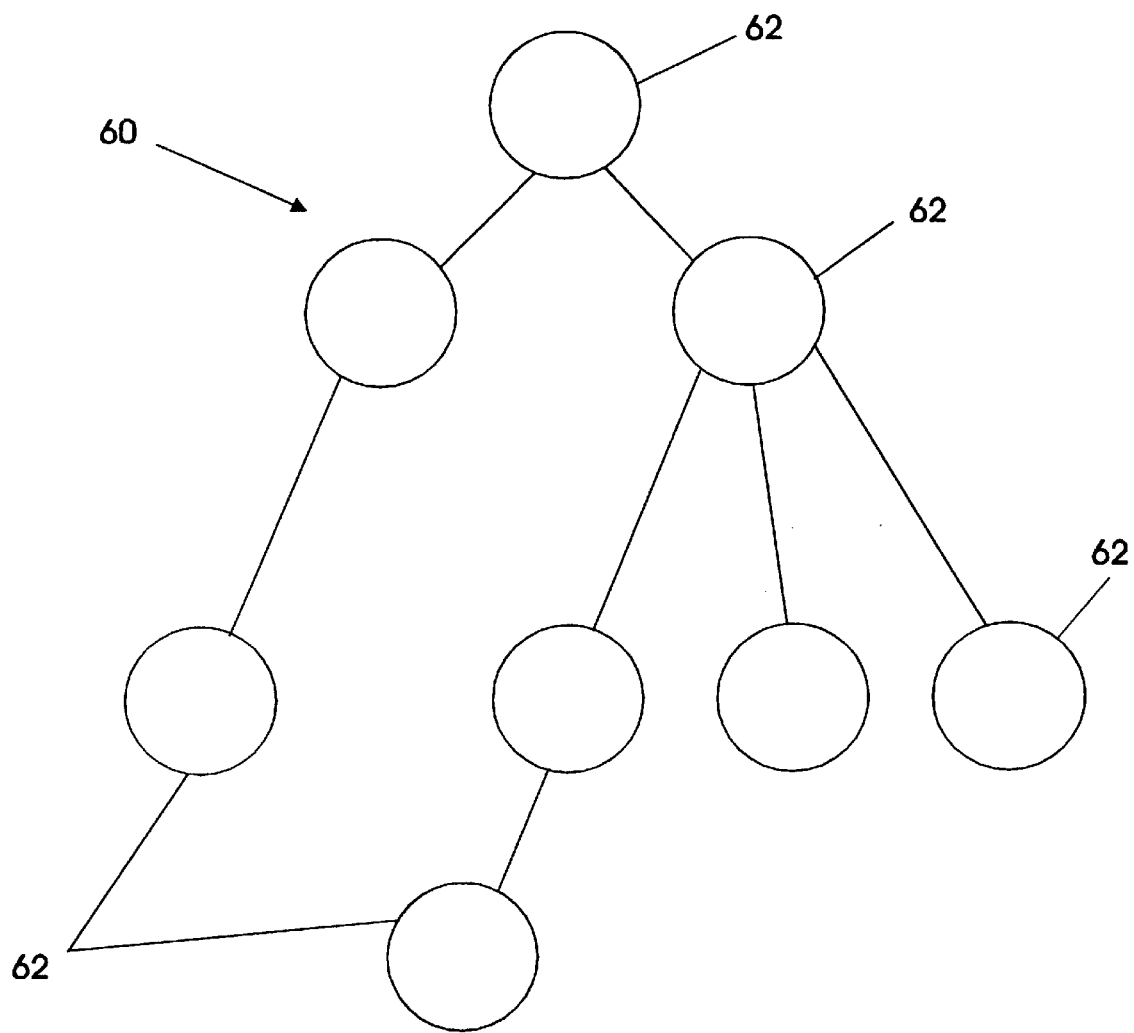
FIG. 4 illustrates a hierarchy of classes.

FIG. 4 illustrates a hierarchy 60 of classes 62. Object oriented hierarchies employ the concept of superclasses and subclasses. A class inherits all variables and methods from classes which are higher in the hierarchy of classes (superclasses). The inheriting class is referred to as a subclass of its superclasses.

Many of the weaknesses of the prior art approaches for synchronizing design with code derive from a unidirectional focus: they attempt to either infer code from the design or to infer design from code. However, code inferred from design is usually poor code and is often incomplete, while design inferred from code is similarly flawed. Rather than dispense with humanly created code or design, both should be maintained in such a way that the declared design intent remains synchronized with the actual effect of the code.

In the present invention, we use static analysis to synchronize design and code. This static analysis is approached in a manner analogous to the way a virtual machine executes compiled Smalltalk code. A Smalltalk compiler converts Smalltalk source code into byte codes, which are interpreted by a virtual machine. This virtual machine (VM) supports Smalltalk, but can support other languages as well. The VM architecture is that of a stack machine. Byte codes define the pushing of objects from variables onto a stack, popping objects from the stack to store them into variables, and sending messages which pop their arguments and the receiver from the stack and push the result onto the stack. The byte codes themselves live within objects (compiled methods) that are executed under control of a virtual machine. Each invocation of a method or a block is managed by a MethodContext or BlockContext object which maintains an instruction pointer into its byte codes and provides private state (method and block temps and args). Active contexts (i.e., those that have begun but not finished execution) are on a separate context stack with the top most context being the one the virtual machine is actively executing. Returning from a method pops this context stack.

When a Smalltalk VM executes code, three categories of activities occur: (1) interpretation of byte codes that have been previously compiled from Smalltalk methods; (2) handling exceptions, especially DoesNotUnderstand, and handling of external events; and (3) the creation and destruction of objects (memory management). Almost all of the visible behavior of Smalltalk code occurs under the explicit direction of byte codes.

When code is read to understand its effects, the actual objects are mentally replaced with generic stand-ins. In a design VM machine, "qualifiers" stand in for the objects so described. A qualifier characterizes the objects that are qualified to occupy a variable given the role the variable plays in the design of the method. As such, the system of qualifiers proposed here is an object oriented (OO) type system. The term qualifier is used rather than "type" to avoid some of the confusion and debate about just what is an OO type. "Signatures", similarly, stand in for methods invoked as a result of a message send. Each method is described by a signature. A signature defines in a formal way the kind of object intended to be returned from the method and, if the method has arguments, the kinds of objects intended to occupy the arguments. The "kind of object" is specified by a qualifier. Thus, objects and message sends are well described by qualifiers and signatures respectively. Therefore, the design analog of the effect of executing code can be determined by creating a VM that "executes" Smalltalk code by replacing objects with qualifiers and messages with signatures. That is, where objects are pushed and popped to and from variables at runtime, qualifiers are pushed and popped to and from attributes by the design VM. Where messages are looked up by the VM at runtime, args pushed, appropriate method invoked, and the return value left on the stack, signatures are looked up by the design virtual machine, arg qualifiers pushed, and the return qualifier (as determined by the signature) is left on the stack. These activities are orchestrated by byte codes at runtime and by byte code analogs called ExecutionSteps in the design VM. ExecutionSteps can be generated by the Smalltalk parser in a manner very similar to its generation of byte codes.

The following table shows the basic correspondences:

| EXECUTION MODEL | DESIGN MODEL |
| --- | --- |
| virtual Machine | Execution Model |
| Objects | Qualifiers |
| Message Sends | Signatures |
| Contexts | Execution Contexts |
| Variables | Attributes |
| Byte Codes | Execution Steps |

A sample of execution steps in accordance with the present invention appears below:

| Execution Step | Creating Parse Tree Node (s) | Function |
| --- | --- | --- |
| SEMDupeTOS | assignment expression, cascaded expression | push a duplicate of the top qualifier on the stack |
| SEMEnterBlockContext | block | set up attributes local to the block |
| SEMPopAndStoreBlockArg | block temporary variable | pop block arguments & store into local block attributes |
| SEMPopAndStoreVar | assignment expression | pop top qualifier & store to attribute |
| SEMPushLiteralBlock | block | push block context onto top of context stack (hence execution of block begins) |
| SEMPushVar | variable | get qualifier from attribute & push onto qualifier stack |
| SEMReturnTOS | statement | pop top qualifier & add to collection of possible returns from the method |
| SEMSend | message expression | look-up signature(s) of possible receiver(s) as specified by receiver qualifier(s), create return qualifier as dictated by receiving signature(s) |

Figure 5:
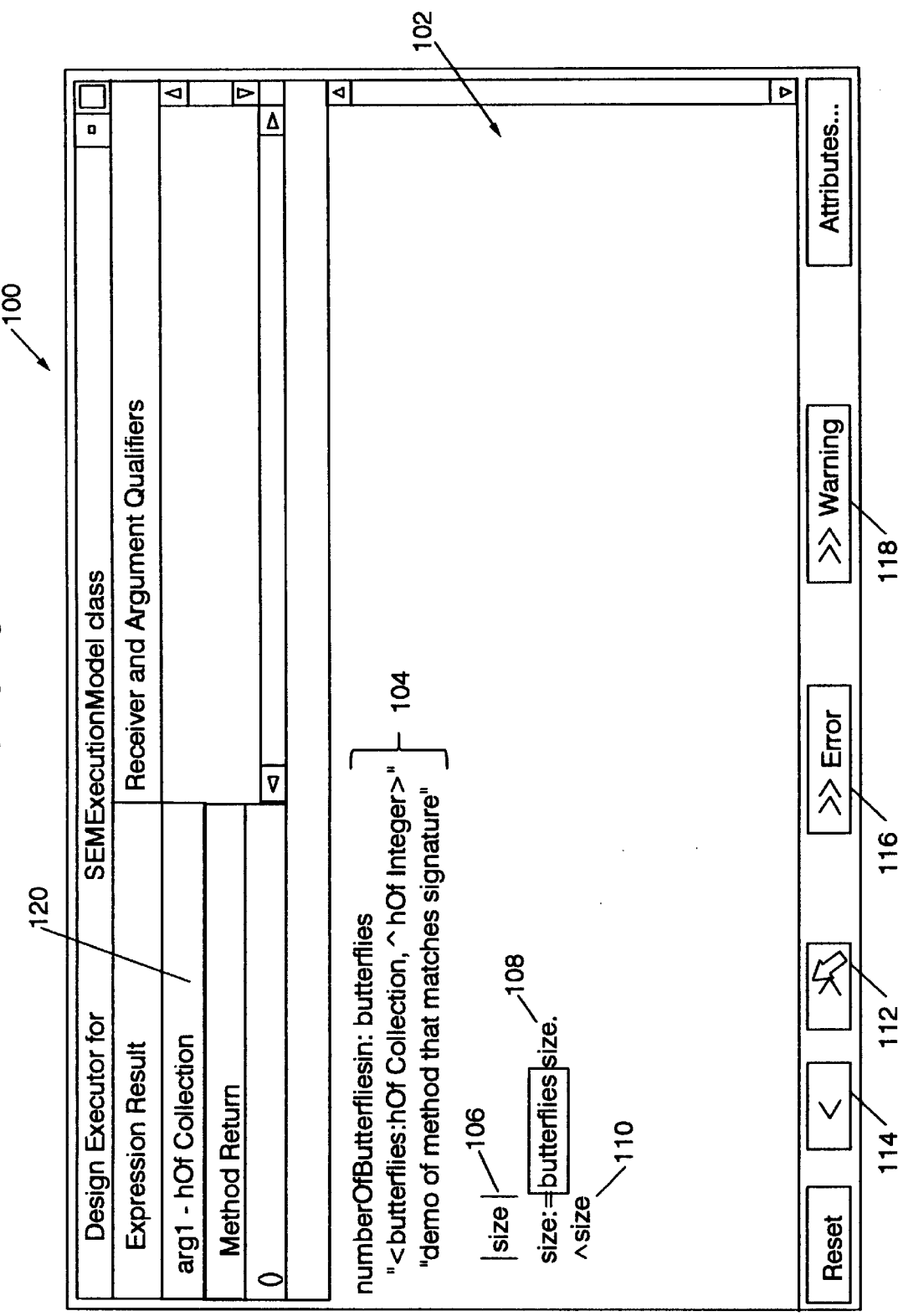
FIGS. 5–9 illustrate the present invention in use with code that meets design criteria.

Referring now to FIG. 5, the present invention will be illustrated in relation to a simple example. In this simple example, a computer program is to be prepared comprising a plurality of functions and steps. One step in the program is to receive a collection, for example, a collection of butterfly objects, and the program is to analyze the collection and return an integer, i.e., how many butterflies are in the collection. The design statement could be as follows: "I am going to give you a collection in the variable butterflies, and you return to me an integer." Such a statement would then be indicated as: <butterflies:hOf Collection,^hOf Integer>. This design statement would then be given to a programmer to prepare the code (or the code would be written by the designer).

FIG. 5 shows a window 100, which contains a "Design Executor" for utilization with the present invention. The window 100 is reached from an enhanced Smalltalk browser. It is important to note that with the use of the present invention, not only is an experienced programmer able to search for and correct errors, but also a novice can understand what is going on with the code and the design.

Within a working area 102, the programmer has provided notation generally designated by the reference numeral 104, to remind him of what the code is to accomplish. Such programming code then appears in line 106, 108 and 110. Of particular interest is line 108, in which the following terms appear: "size:=butterflies size." One frequent error in programming is the elimination of the colon prior to the equal sign in this line, as will be shown in a subsequent example.

The programming code executes execution steps which are not shown in FIG. 5. The execution steps are shown below in Table X, which comprises both visible execution steps and non-visible execution steps (marked with an asterisk), which are housekeeping steps.

TABLE X

| | |
|---|---|
| 1.* | SEMEnterMethodContext |
| 2. | SEMPushVar (#argument butterflies) |
| 3.* | SEMPopReceiver |
| 4. | SEMSend (#unary size) |
| 5.* | SEMDupeTOS |
| 6. | SEMPopAndStoreVar (#temporary size) |
| 7.* | SEMPopTOS |
| 8. | SEMPushVar (#temporary size) |
| 9. | SEMReturnTOS ^size |
| 10.* | SEMExitMethodContext |

By clicking on button 112, the present invention is started. The button 112 is used to step through the code one visible step at a time. Similarly, button 114 can be used to step backwards in the code one visible step at a time. Also provided are buttons 116 and 118. By selecting button 116, the present invention will step through the code until an error is located or until the end of the method. By selecting button 118, the present invention will step through the code until a warning is received.

Having clicked on button 112, "butterflies" in line 108 is highlighted. The present invention executes this step (step 2 in Table X) by getting whatever object is in the variable butterflies. The result of this step is placed in field 120, labeled "Expression Result." The result of this step, as shown in field 120, is some kind of collection. The user then clicks on button 112 again in order to proceed through the code.

Figure 6:
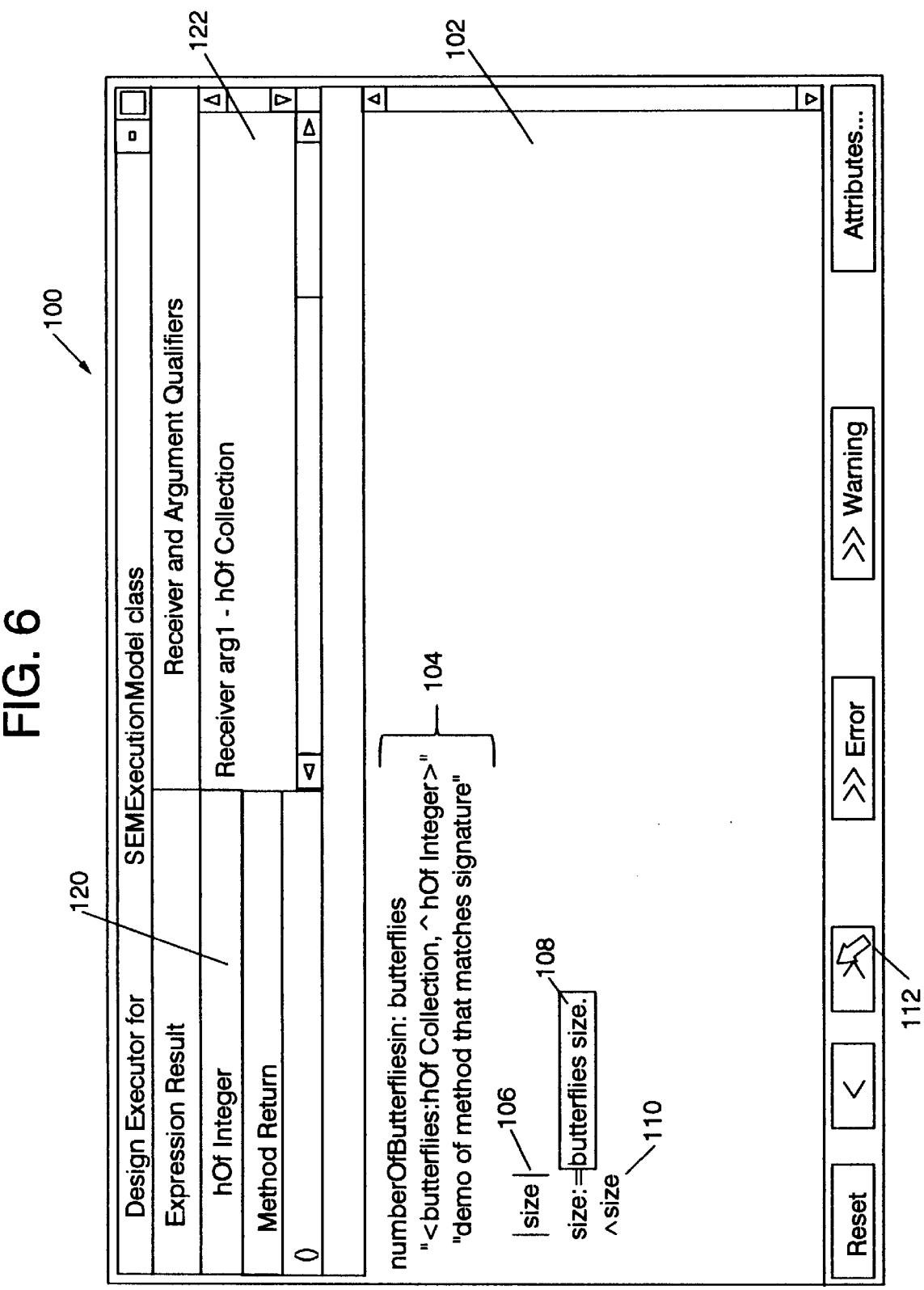

Referring to FIG. 6, "butterflies size" is highlighted in line 108. This step (step 4 in Table X) requires that a message "size" be sent to the object "butterflies", which is a collection. Again, the result is some kind of integer as shown in field 120. Additionally, in a field 122, entitled "Receiver and Argument Qualifiers", information appears about message steps.

Figure 7:
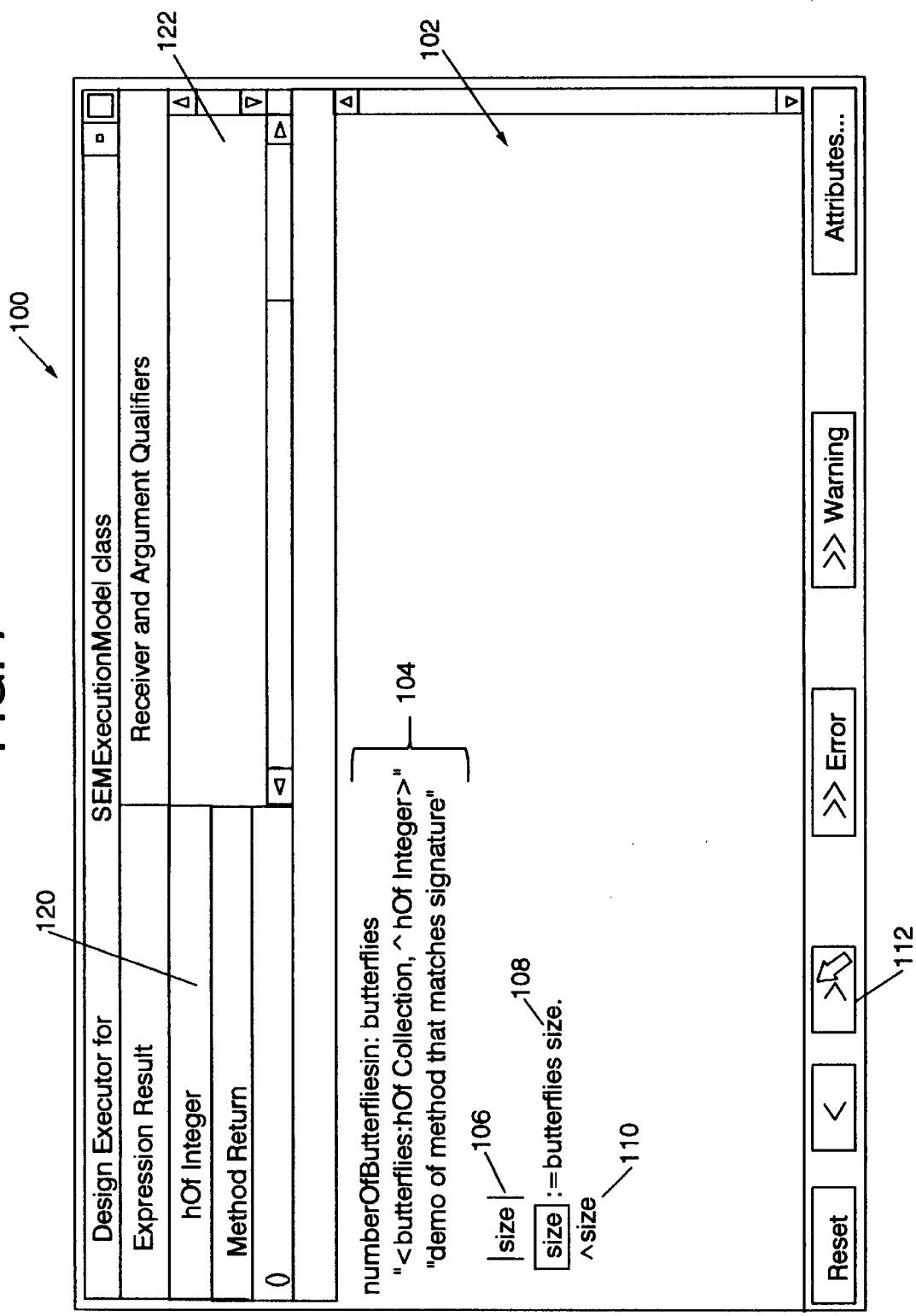

Upon clicking button 112 again, the display as shown in FIG. 7 appears. The present invention proceeds to the next step (step 6 in Table X) in the code in which "size" in line 108 is highlighted. In this step, the object was stored in the variable called "size", and the result is some kind of integer as shown in field 120.

Figure 8:
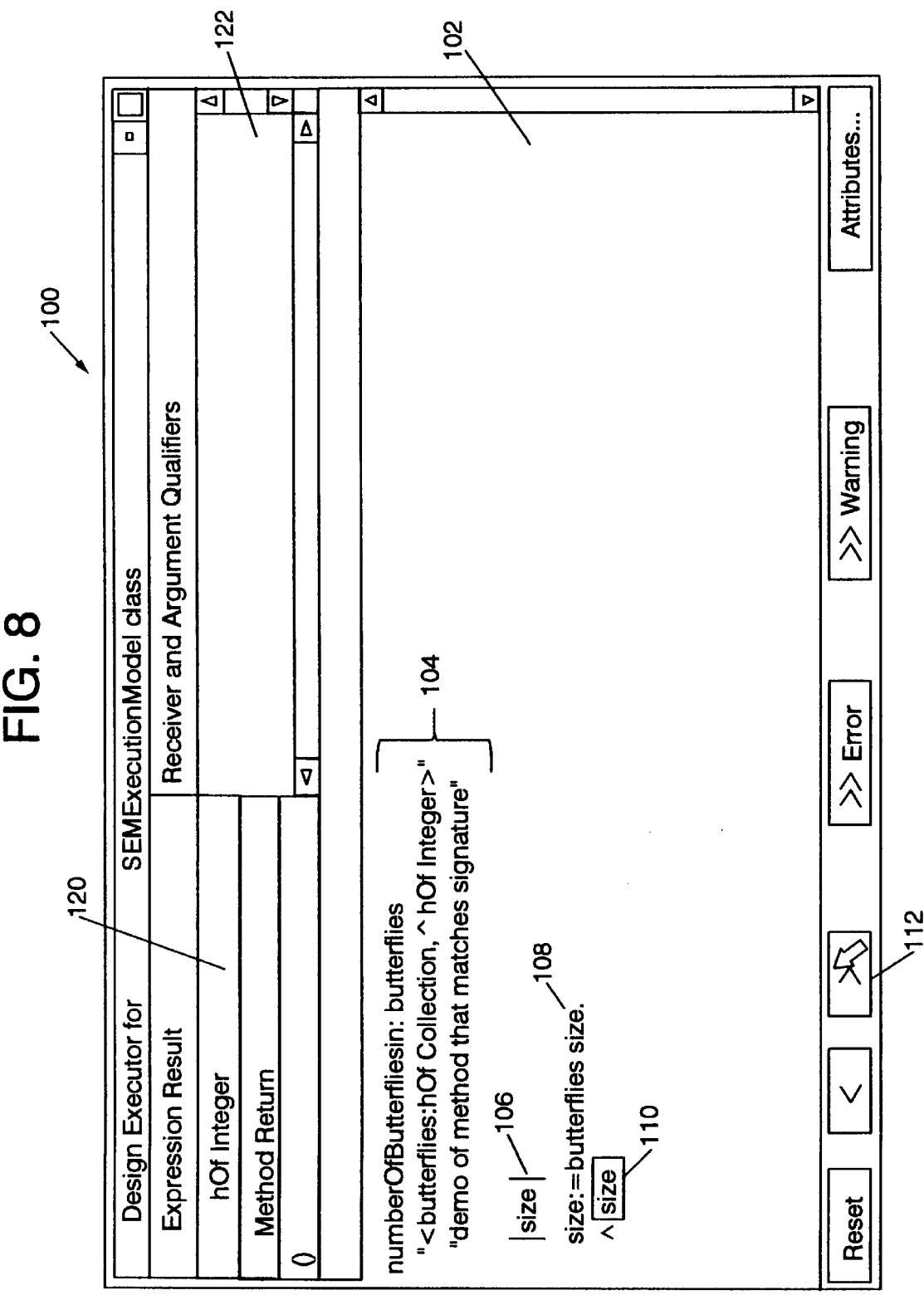

Referring to FIG. 8, the user has clicked on button 112, causing "size" in line 110 to be highlighted. This step(step 8 in Table X) causes fetching of the variable "size" which, as shown by field 120, contains some kind of integer.

Figure 9:
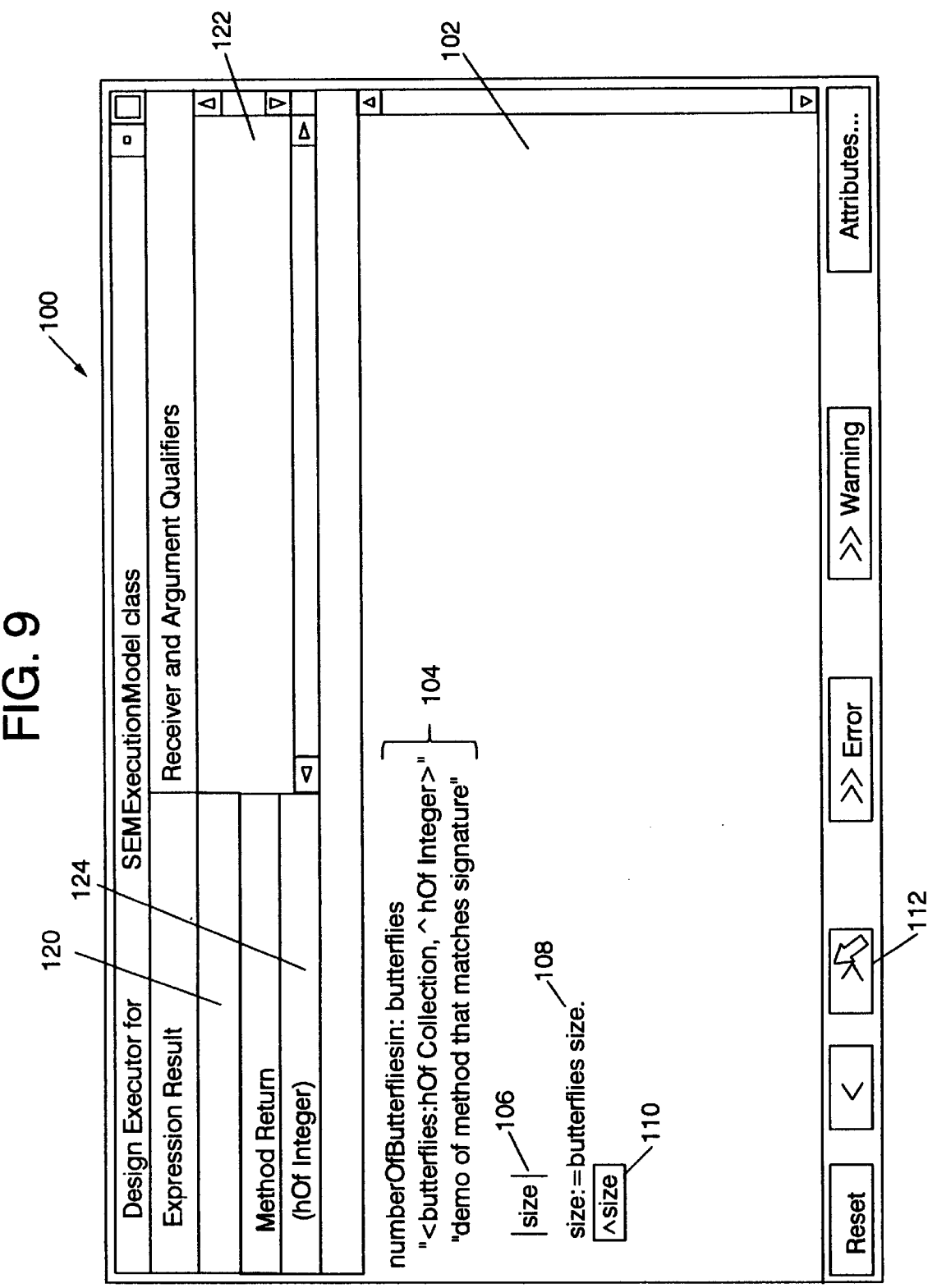

Referring to FIG. 9, the user has again clicked on button 112, causing the entire line 110 "^size" to be highlighted. The operation run by the entire line 110 is a return (^) (step 9 in Table X) and the result of the return is shown in field 124 entitled "Method Return", which is some kind of integer. Thus, in field 124 a correct return is shown as was expected from the design statement, i.e., some kind of integer is returned per the declared design called. Thus, a programmer has been shown that the design statement has been properly coded.

Figure 10:
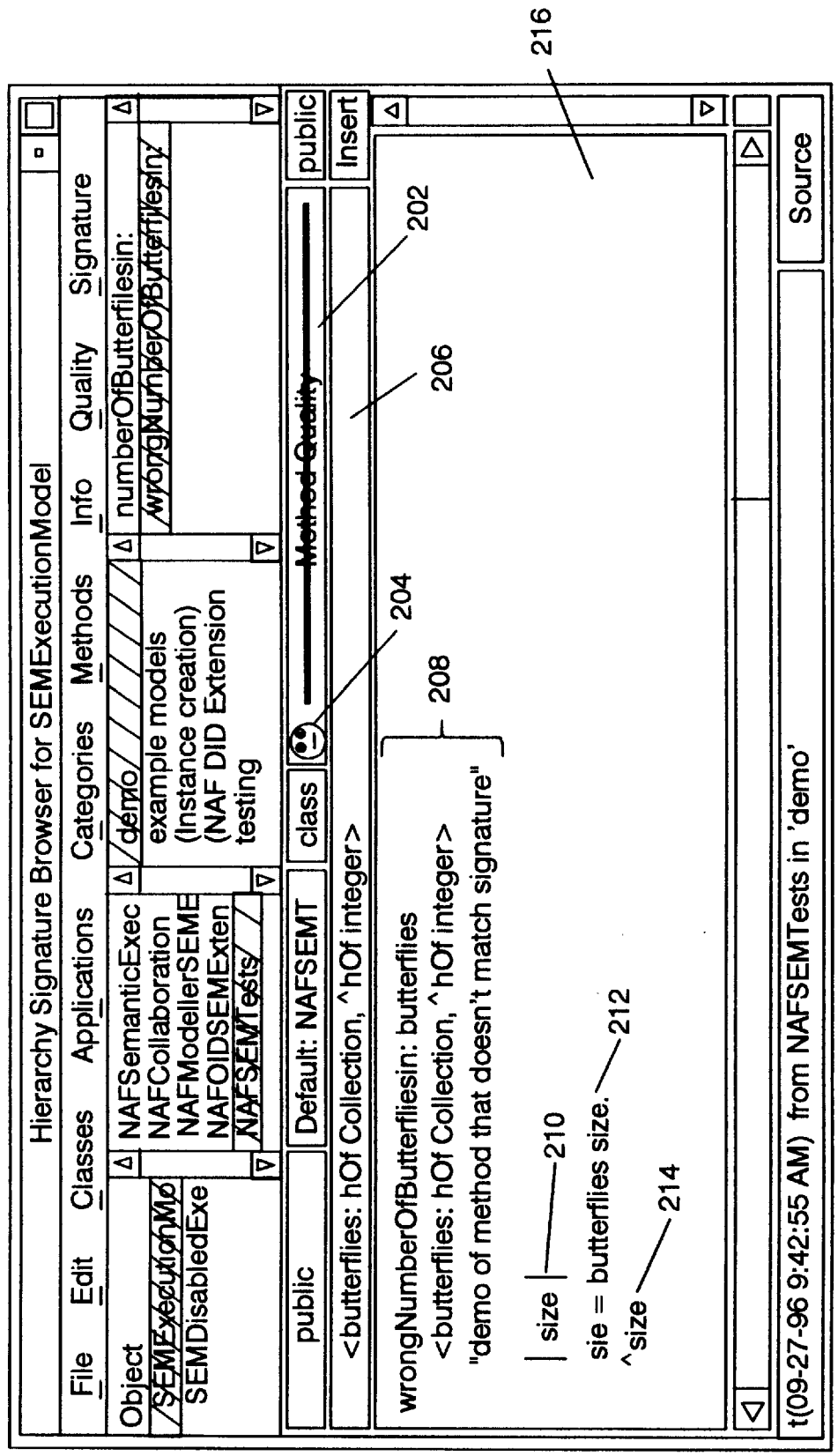
FIGS. 10–17 illustrate the present invention in use with code that does not meet design criteria.

Referring next to FIGS. 10 through 17, the present invention is illustrated in accordance with an example of a coding error. Referring first to FIG. 10, we see a standard smalltalk browser such as is commercially available, but further enhanced with controls to warn the user of a potential design defect. A user has clicked on this method in the browser producing the window generally indicated by reference numeral 200. The window 200 indicates, via various signals, that there is a problem with the code. For example, within the information bar 202, entitled "Method Quality", there appears a symbol (a non-smiling circular face 204) to indicate that there may be a problem with the code. Additional methods may be used to warn the user of potential problems, such as color coding, highlighting, sound, etc. Within field 206, the design statement for this method is listed, as previously described above. As can be seen, the design statement is the same as per the example shown in FIGS. 5 through 9 above. In the area generally designated by reference numeral 208, one finds notation information provided by the programmer for future reference. As with the example in FIGS. 5 through 9, the code statement appear on lines 210, 212 and 214, all within a working area 216. For this example, it is important to note that the required ":=" sign is missing from line 212, which will cause an error. Upon selecting the method statement, as appears in field 206, and receiving the signal 204, the user knows that there is a problem with this code. Therefore, by selecting with the mouse pointer "Method Quality" within the information bar 202, FIG. 11 appears. It is important to note that all the execution steps, as will be subsequently described herein, have already been run in the background. That is why an indication has been received that there is a problem with the code, and now the user can see what the problem s are.

Figure 11:
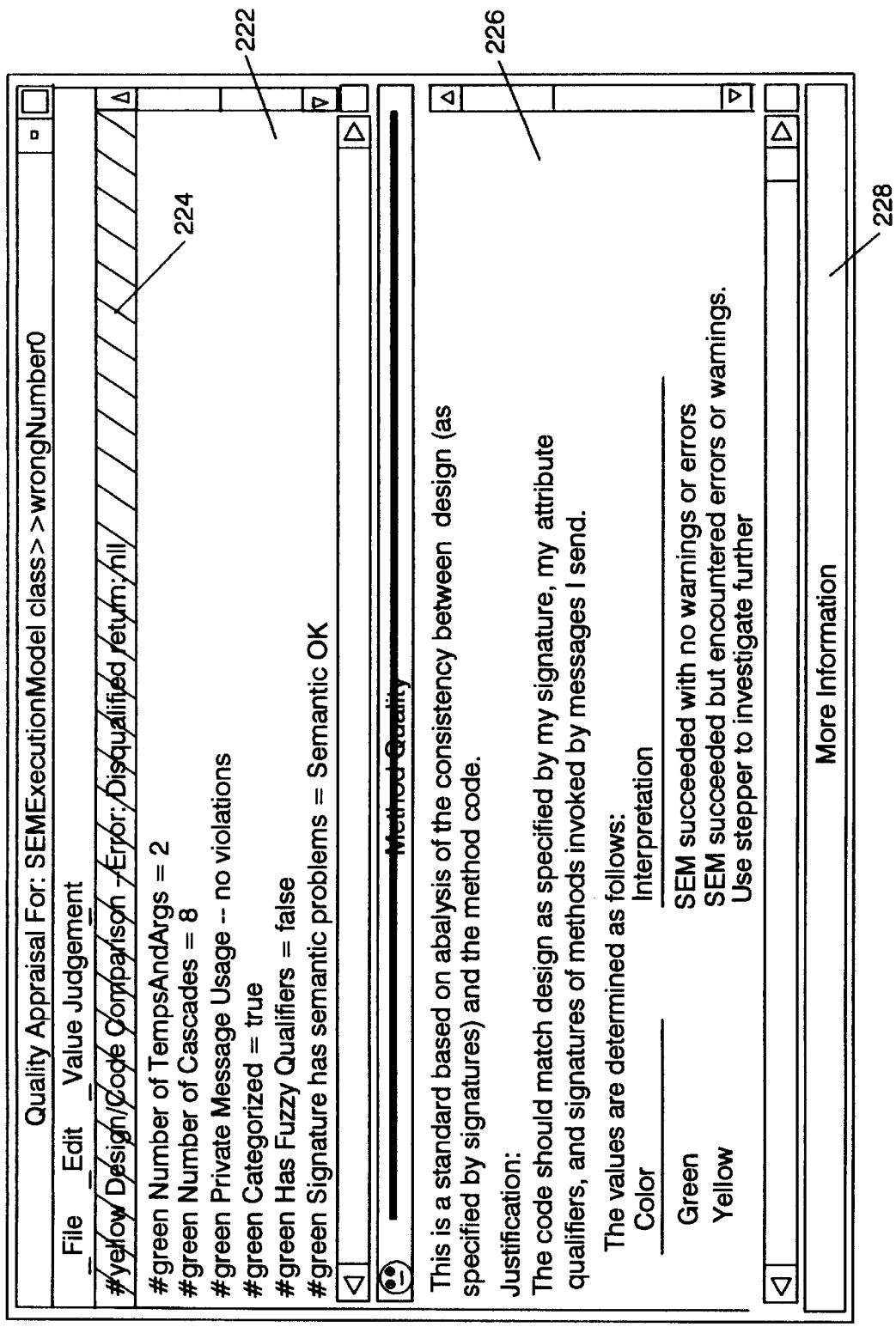
Figure 12:
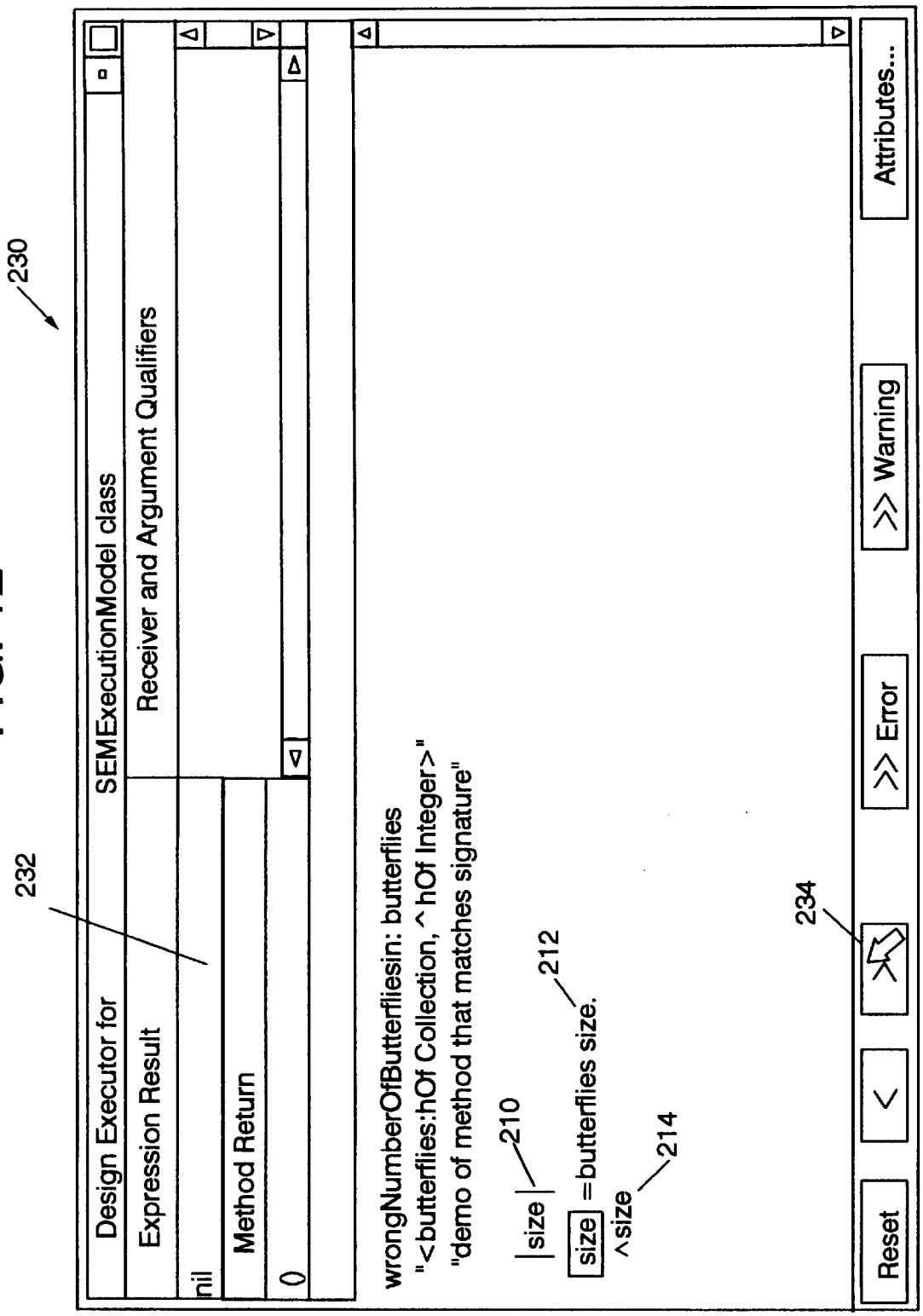

Referring to FIG. 11, in panel 220, a listing of all possible problems are indicated. For example, within field 222 there is an indicated problem on line 224. The problem on line 224 may be indicated by text, color, or any other appropriate methodology. By selecting the line 224 in area 222, information is entered into area 226 as is shown. The information in the area 226 provides indications to the user as to what happens as a result of running the code. In addition, "More Information" appears in area 228 at the bottom of the window 220. By clicking on the area 228, the window 230 as is shown in FIG. 12 appears. The window 230 is similar to the window 100 from FIG. 5 and the explanation therewith.

Referring to FIG. 12, the user, as with the previous example, is back in the "stepper" or "Design Executor" to run through the code as before. Since the colon was omitted from line 212, which, as we already know from the first example, should be there, the present invention starts with "size" in line 212. The present invention is told to fetch "size", and since "size" has never been initialized, it contains nothing as is shown in field 232, entitled "Expression Result." By clicking on button 234, the next step occurs.

Figure 13:
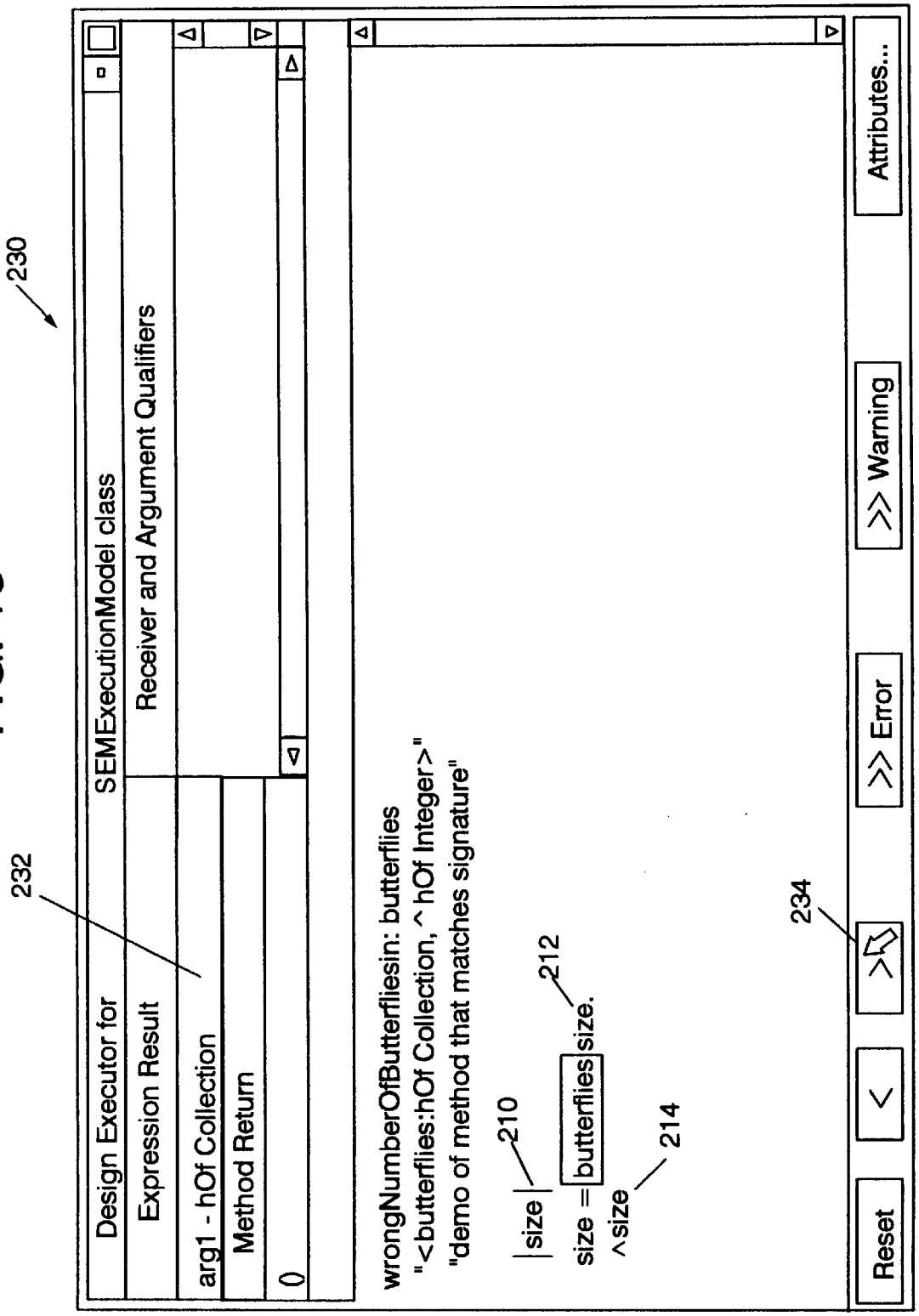

Referring to FIG. 13, "butterflies" is highlighted in line 212, and the computer program gets whatever object is in the variable "butterflies." The result appears in the field 232 as some kind of collection. The user then clicks on button 234 to initiate the next step.

Figure 14:
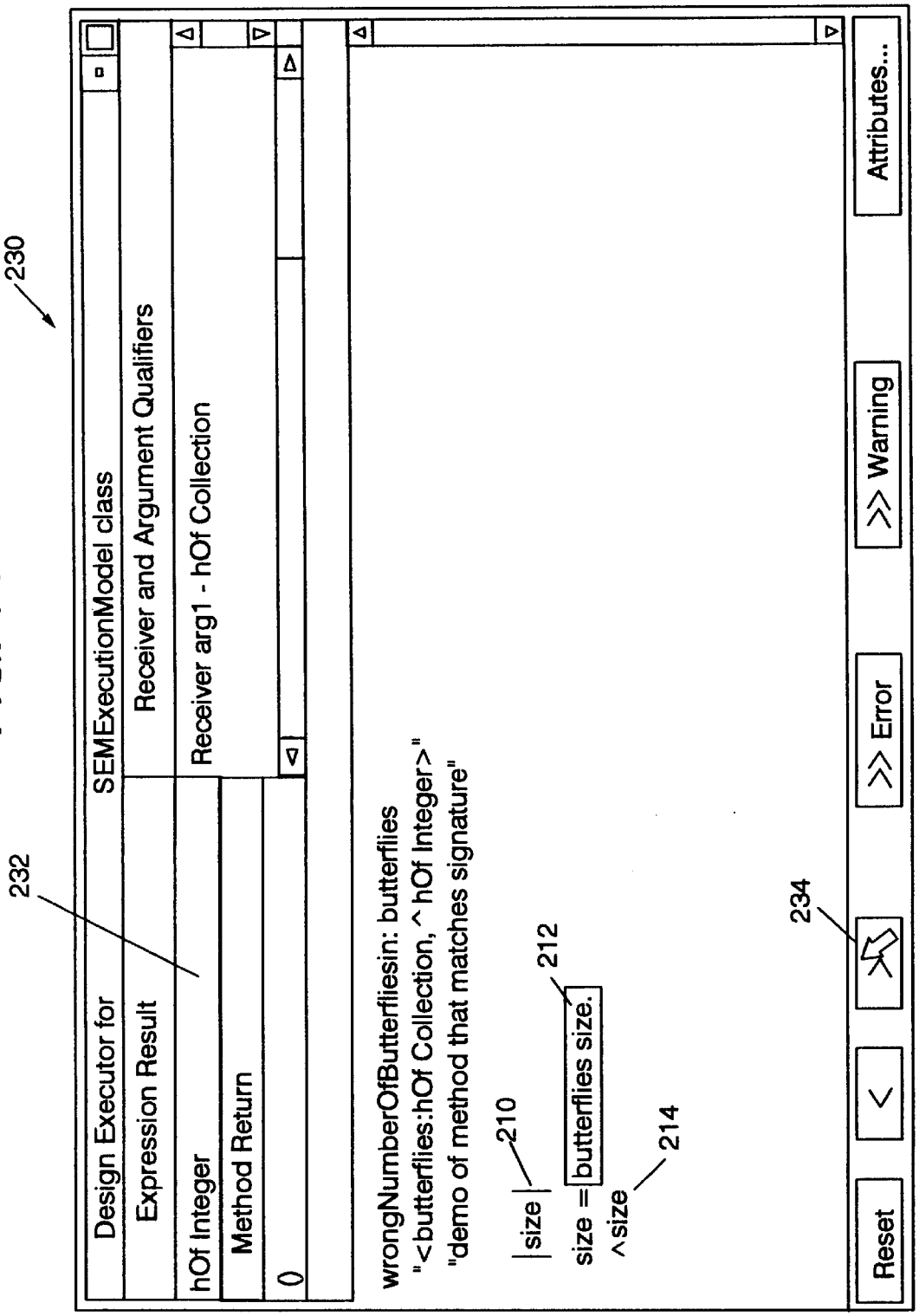

Referring to FIG. 14, "butterflies size." is highlighted in line 212. Th e message size is thus to be sent to the object "butterflies", which is a collection. The result, as shown in field 232, is some kind of integer. By again clicking on button 234, the next step is initiated.

Figure 15:
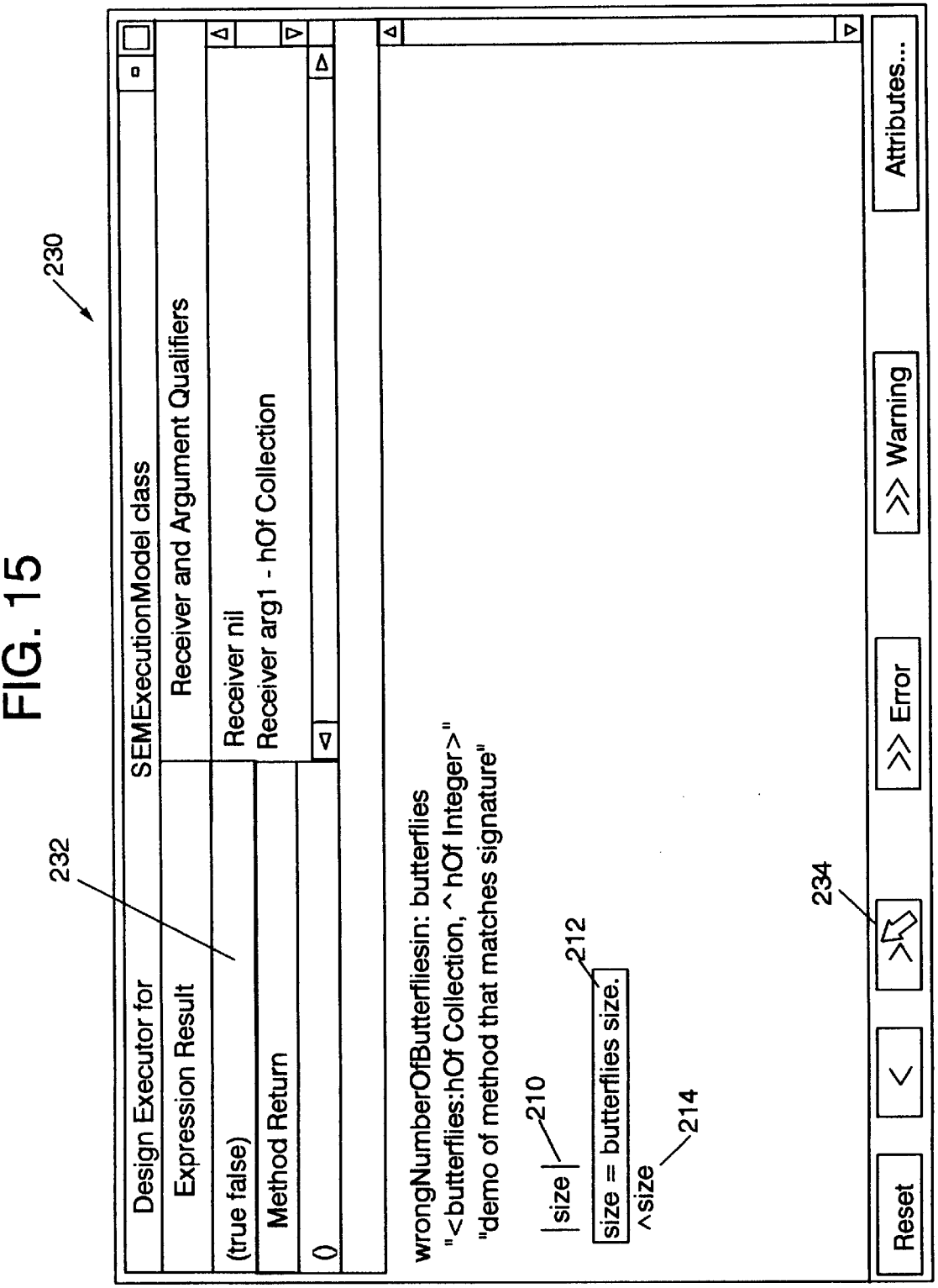

Referring to FIG. 15, the entire line 212 is highlighted. This step, unlike the step shown in FIG. 7, executes only the equal sign versus the assignment (:=), and the result is either true or false, as shown in field 232. The user then clicks on button 234 to initiate the next step of the present invention.

Figure 16:
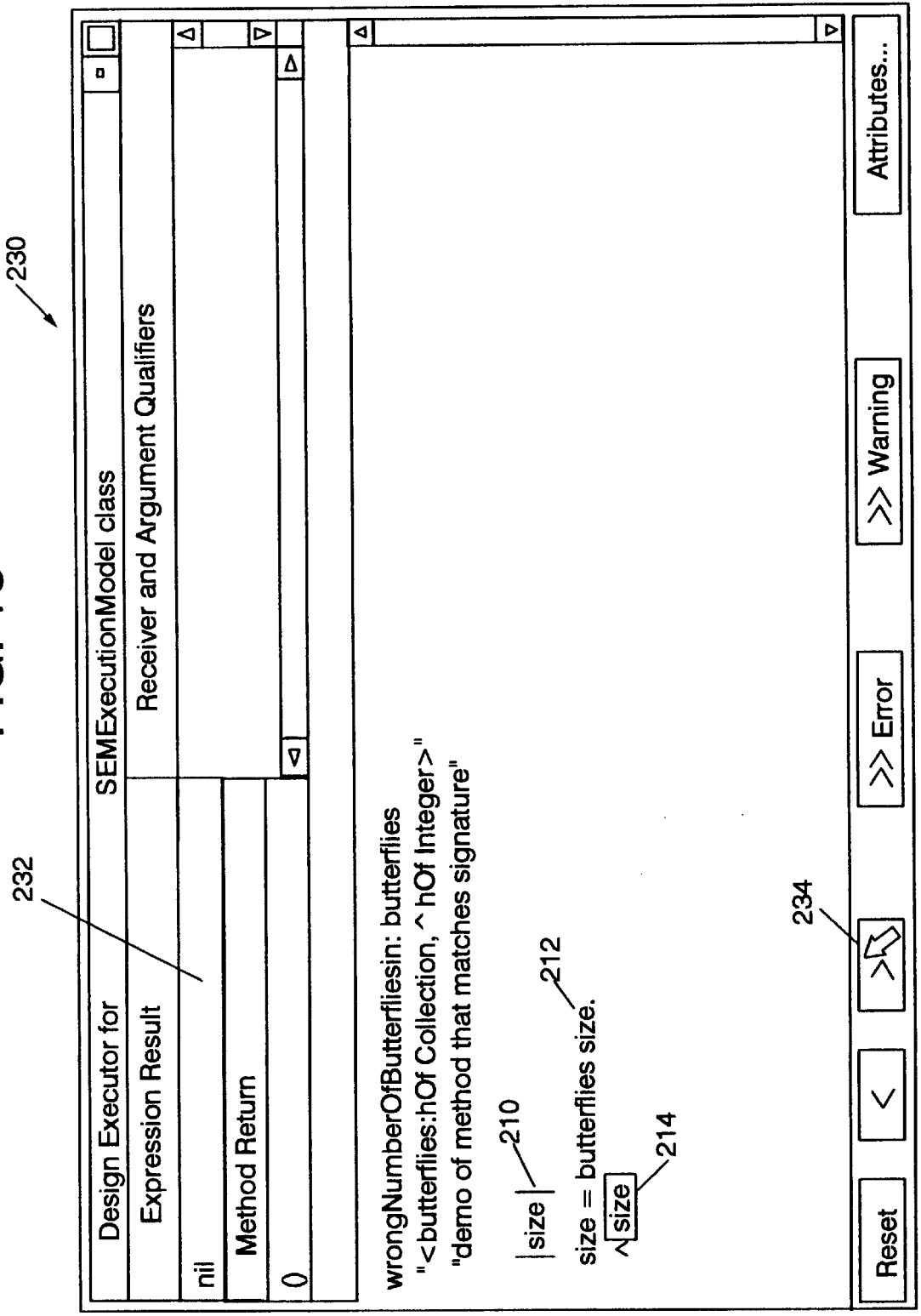

Referring to FIG. 16, "size" in line 214 is highlighted. The program executes the step: go get "size" and this value is still nill, as shown in field 232, which does not meet the design statement of an integer. The user then clicks on button 234 to initiate the final step of the present invention.

Figure 17:
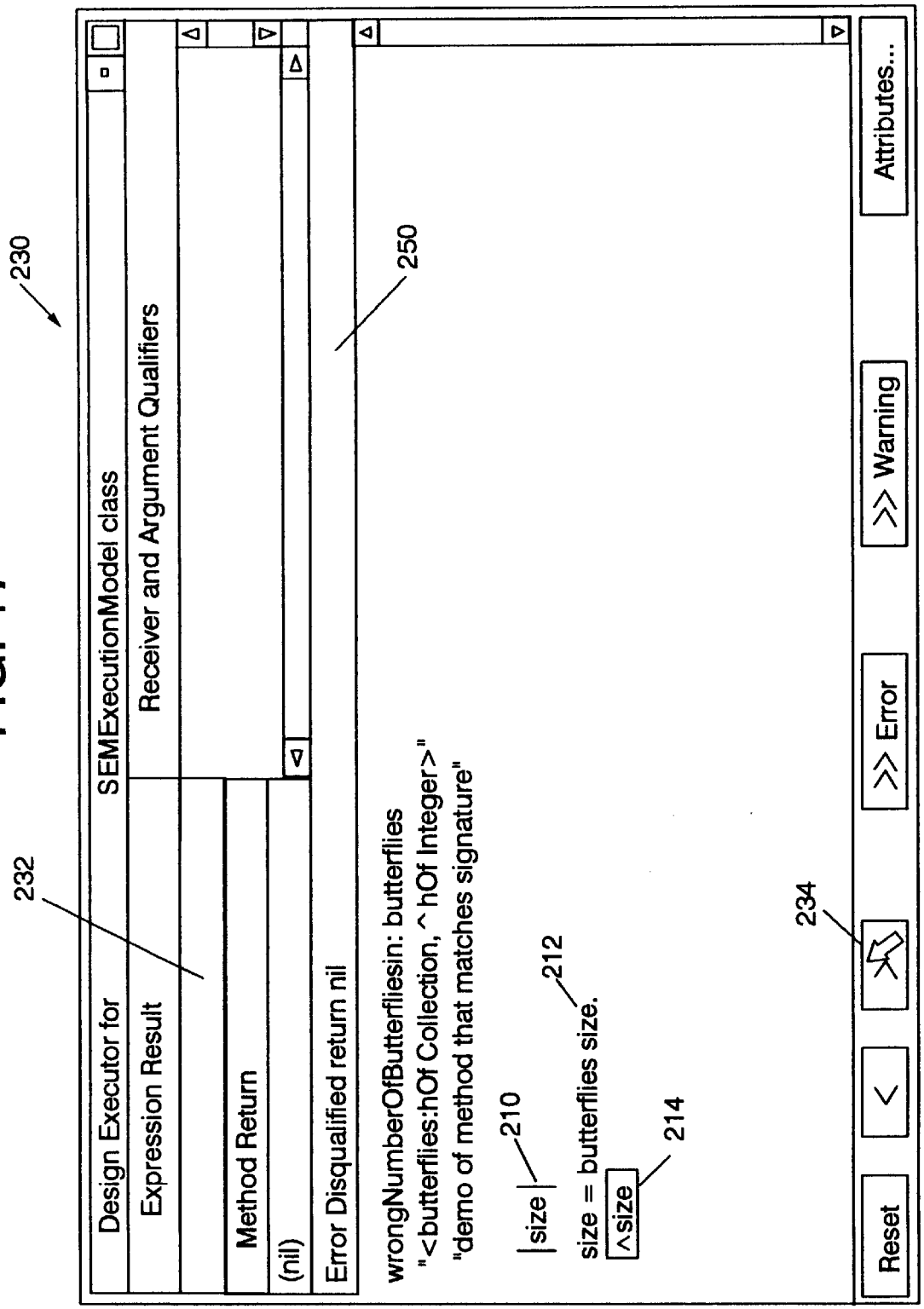

Referring to FIG. 17, the entire line 214 "^size" is highlighted. This step does the actual return and gets an error message as shown in field 250. This return is compared with the declared design return, and it is quickly determined to be an illegal return, i.e., nill is not an integer and, therefore, the user knows that an error has occurred. At this point, if not sooner, it is intuitively obvious to one skilled in the art that line 212 has an error therein, i.e., an equal sign rather than a ":=".

Figure 18:
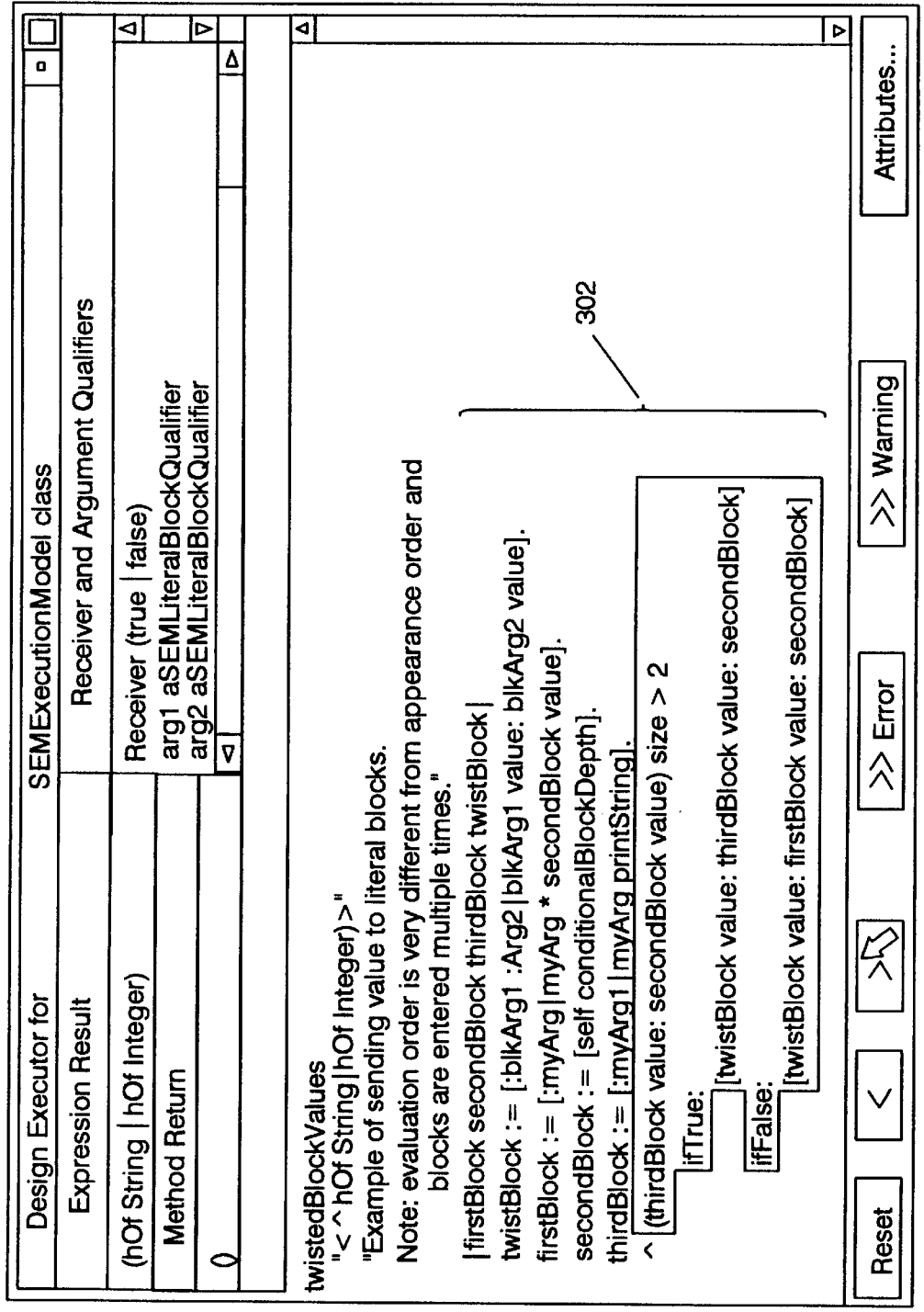
FIG. 18 illustrates a more complex code example for use with the present invention.

Referring to FIG. 18, a panel 300 is shown as an example of a more complex code analysis for which the present invention is particularly adapted. A skilled programmer will not be able to look at the code generally designated by reference numeral 302 and immediately know whether there is an error or not. Therefore, by utilizing the present invention and stepping through the code sequentially, it is possible to check the entire code for errors against the design statement without running the code with an entire program, as in accordance with the prior art.

Although the present invention has been described with respect to the specific preferred embodiment thereof, various changes and modifications may be suggested to one skilled in the art, and it is intended that the present invention encompass such changes and modifications as falls in the scope of the appended claims.

I claim:

1. A design virtual machine method of synchronizing code with design in an object oriented computer programming environment, comprising the steps of:

creating from source code that defines a method, execution steps that specify design implications of said source code; and as directed by said execution steps, tracing through the design one execution step at a time in order to determine whether said source code reflects intent of the design, said step of tracing comprising the steps of:

fetching design information appropriate to source code as specified by an execution step being analyzed;

executing said execution step; and checking results of said executing for compatibility with the design.

2. The method of claim 1, wherein said step of creating execution steps comprises:

creating execution steps from a plurality of different object oriented languages.

3. The method of claim 2, wherein said plurality of object oriented languages includes Smalltalk, said step of creating execution steps comprising the steps of:

using a parse tree created by a compiler for said Smalltalk language; and using augmented behavior of said parse tree to create analogous execution steps that match a function of byte codes normally created from said parse tree by said compiler.

4. The method of claim 2, wherein said plurality of object oriented languages are compiled into a set of known byte codes, said step comprising:

creating from said byte codes analogous execution steps that match a function of said byte codes.

5. The method of claim 4, further including:

analyzing Java applets prior to their execution on an intranet in order to screen said applet's capabilities.

6. The method of claim 1, wherein said step of creating execution steps comprises:

creating execution steps from byte codes received over an internet.

7. The method of claim 1, wherein said step of tracing further comprises:

storing inputs to and outputs from each of said execution steps in order to collect information about collaborators.

8. The method of claim 7, wherein said step of storing further comprises:

creating visual representations of each of said execution steps.

9. A design virtual machine system for synchronizing code with design in an object oriented computer programming environment, comprising:

means for creating from source code that defines a method, execution steps that specify design implications of said source code; and as directed by said execution steps, means for tracing through the design one execution step at a time in order to determine whether said source code reflects intent of the design, said means for tracing comprising:

means for fetching design information appropriate to source code as specified by an execution step being analyzed;

means for executing said execution step; and means for checking results of said means for executing for compatibility with the design.

10. The system of claim 9, wherein said means for creating execution steps comprises:

means for creating execution steps from a plurality of different object oriented languages.

11. The system of claim 10, wherein said plurality of object oriented languages includes Smalltalk, said means for creating execution steps comprising:

means for using a parse tree created by a compiler for said Smalltalk language; and means for using augmented behavior of said parse tree to create analogous execution steps that match a function of byte codes normally created from said parse tree by said compiler.

12. The system of claim 10, wherein said plurality of object oriented languages are compiled into a set of known byte codes, said means for creating execution steps comprising:

means for creating from said byte codes analogous execution steps that match a function of said byte codes.

13. The system of claim 12, further including:

means for analyzing Java applets prior to their execution on an intranet in order to screen said applet's capabilities.

14. The system of claim 9, wherein said means for creating execution steps comprises:

means for creating execution steps from byte codes received over an internet.

15. The system of claim 9, wherein said means for tracing further comprises:

means for storing inputs to and outputs from each of said execution steps in order to collect information about collaborators.

16. The system of claim 15, wherein said means for storing further comprises:

means for creating visual representations of each of said execution steps.

17. A computer program product recorded on computer readable medium for a design virtual machine for synchronizing code with design in an object oriented computer programming environment, comprising:

computer readable means for creating from source code that defines a method, execution steps that specify design implications of said source code; and as directed by said execution steps, computer readable means for tracing through the design one execution step at a time in order to determine whether said source code reflects intent of the design, said computer readable means for tracing comprising:

computer readable means for fetching design information appropriate to source code as specified by an execution step being analyzed;

computer readable means for executing said execution steps; and computer readable means for checking results of said computer readable means for executing for compatibility with the design.

18. The program product of claim 17, wherein said computer readable means for creating execution steps comprises:

computer readable means for creating execution steps from a plurality of different object oriented languages.

19. The program product of claim 18, wherein said plurality of object oriented languages includes Smalltalk, said computer readable means for creating execution steps further comprises:

computer readable means for using a parse tree created by a compiler for said Smalltalk language; and computer readable means for using augmented behavior of said parse tree to create analogous execution steps that match a function of byte codes normally created from said parse tree by said compiler.

20. The program product of claim 18, wherein said plurality of object oriented languages are compiled into a set of known byte codes, said computer readable means for creating execution steps further comprises:

computer readable means for creating from said byte codes analogous execution steps that match a function of said byte codes.

21. The program product of claim 20, further comprising:

computer readable means for analyzing Java applets prior to their execution on an internet in order to screen said applet's capabilities.

22. The program product of claim 17, wherein said computer readable means for creating execution steps comprises:

computer readable means for creating execution steps from byte codes received over an internet.

23. The program product of claim 17, wherein said computer readable means for tracing further comprises:

computer readable means for storing inputs to and outputs from each of said execution steps in order to collect information about collaborators.

24. The program product of claim 23, wherein said computer readable means for storing further comprises:

computer readable means for creating visual representations of each of said execution steps.

25. A method of synchronizing code with design in an object oriented computer programming environment, comprising the steps of:

creating execution steps for a selected method from a plurality of different object oriented languages, including Smalltalk, using a parse tree created by a compiler for said Smalltalk language;

using augmented behavior of said parse tree to create analogous execution steps that match a function of byte codes normally created from said parse tree by said compiler; and as directed by said execution steps, tracing through the design one step at a time, said step of tracing comprising the steps of:

fetching appropriate design information; and checking for design violations.

26. A system for synchronizing code with design in an object oriented computer programming environment, comprising:

means for creating execution steps for a selected method from a plurality of different object oriented languages, including Smalltalk, using a parse tree created by a compiler for said Smalltalk language;

means for using augmented behavior of said parse tree to create analogous execution steps that match a function of byte codes normally created from said parse tree by said compiler; and as directed by said execution steps, means for tracing through the design one step at a time, said means for tracing comprising:

means for fetching appropriate design information; and means for checking for design violations.

27. A computer program product recorded on computer readable medium for synchronizing code with design in an object oriented computer programming environment, comprising:

computer readable means for creating execution steps for a selected method from a plurality of different object oriented languages, including Smalltalk, using a parse tree created by a compiler for said Smalltalk language;

computer readable means for using augmented behavior of said parse tree to create analogous execution steps that match a function of byte codes normally created from said parse tree by said compiler; and as directed by said execution steps, computer readable means for tracing through the design one step at a time, said computer readable means for tracing comprising:

computer readable means for fetching appropriate design information; and computer readable means for checking for design violations.

* * * * *